United States Patent
Baehrle-Miller et al.

(10) Patent No.: US 11,161,485 B2
(45) Date of Patent: Nov. 2, 2021

(54) METHOD AND DEVICE FOR DRIVER ASSISTANCE

(71) Applicant: Robert Bosch GmbH, Stuttgart (DE)

(72) Inventors: Frank Baehrle-Miller, Schoenaich (DE); Dieter Blattert, Kirchheim/Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 440 days.

(21) Appl. No.: 15/754,322

(22) PCT Filed: Jul. 28, 2016

(86) PCT No.: PCT/EP2016/068109
§ 371 (c)(1),
(2) Date: Feb. 22, 2018

(87) PCT Pub. No.: WO2017/032544
PCT Pub. Date: Mar. 2, 2017

(65) Prior Publication Data
US 2018/0251105 A1     Sep. 6, 2018

(30) Foreign Application Priority Data

Aug. 25, 2015 (DE) ..................... 10 2015 216 214.1

(51) Int. Cl.
*B60T 17/22* (2006.01)
*B60T 7/12* (2006.01)
*B60T 7/22* (2006.01)

(52) U.S. Cl.
CPC ................ *B60T 7/12* (2013.01); *B60T 7/22* (2013.01); *B60T 17/22* (2013.01);
(Continued)

(58) Field of Classification Search
CPC ........ B60T 7/12; B60T 17/22; B60T 2201/10; B60T 2201/12; B60T 2270/402; B60T 7/22
(Continued)

(56) References Cited

U.S. PATENT DOCUMENTS 9,441,689 B2 * 9/2016 Baehrle-Miller ..... B60T 13/588
9,694,799 B2 * 7/2017 Baehrle-Miller ..... B60T 13/588
(Continued)

FOREIGN PATENT DOCUMENTS

DE 10 2006 044 422 A1 4/2008
DE 10 2006 048 910 A1 4/2008
(Continued)

OTHER PUBLICATIONS

International Search Report corresponding to PCT Application No. PCT/EP2016/068109, dated Oct. 26, 2016 (German and English language document) (7 pages).

*Primary Examiner* — Abby Y Lin
*Assistant Examiner* — Hossam M Abd El Latif
(74) *Attorney, Agent, or Firm* — Maginot, Moore & Beck LLP (57) ABSTRACT

The disclosure relates to a method for driver assistance, wherein a vehicle automatically performs a driving maneuver. In the method, a service brake of the vehicle is first actuated. Then a parking brake of the vehicle is controlled in such a way that the parking brake exerts no braking influence and that the free travel to be overcome for actuation of the parking brake is minimized. In subsequent steps, the service brake of the vehicle is released and an automatic driving maneuver is performed, wherein, if a fault or a specified event occurs, the parking brake is actuated such that the vehicle is braked to a standstill and is kept at a
(Continued)

standstill. The disclosure further relates to a driver assistance system that is designed to perform the method.

10 Claims, 4 Drawing Sheets

(52) U.S. Cl.
CPC ....... *B60T 2201/10* (2013.01); *B60T 2201/12* (2013.01); *B60T 2270/402* (2013.01)

(58) Field of Classification Search
USPC .......................................................... 701/70
See application file for complete search history.

(56) References Cited

U.S. PATENT DOCUMENTS

| | | | |
|---|---|---|---|
| 9,802,586 B2* | 10/2017 | Baehrle-Miller | B60T 7/12 |
| 2008/0071457 A1* | 3/2008 | Shiraki | B60T 7/122 |
| | | | 701/70 |
| 2010/0217488 A1* | 8/2010 | Nijakowski | B60T 17/221 |
| | | | 701/48 |
| 2010/0241330 A1* | 9/2010 | Hartmann | B60T 13/746 |
| | | | 701/70 |
| 2010/0308645 A1* | 12/2010 | Maron | B60T 13/588 |
| | | | 303/20 |
| 2012/0161508 A1* | 6/2012 | Beever | B60T 7/12 |
| | | | 303/191 |
| 2012/0205202 A1 | 8/2012 | Baehrle-Miller et al. | |
| 2015/0203081 A1* | 7/2015 | Paulson | B60T 7/22 |
| | | | 701/70 |
| 2016/0355165 A1* | 12/2016 | Forster | B60T 7/122 |

FOREIGN PATENT DOCUMENTS

| | | |
|---|---|---|
| DE | 10 2009 028 505 A1 | 2/2011 |
| DE | 10 2012 025 400 A1 | 6/2014 |
| FR | 2 906 209 A1 | 3/2008 |
| GN | 101835664 A | 9/2010 |
| GN | 103249614 A | 8/2013 |
| JP | 2013-501668 A | 1/2013 |
| WO | 2009/053429 A1 | 4/2009 |
| WO | 2012/080085 A1 | 6/2012 |
| WO | 2015/036393 A1 | 3/2015 |

* cited by examiner

METHOD AND DEVICE FOR DRIVER ASSISTANCE

This application is a 35 U.S.C. § 371 National Stage Application of PCT/EP2016/068109, filed on Jul. 28, 2016, which claims the benefit of priority to Serial No. DE 10 2015 216 214.1, filed on Aug. 25, 2015 in Germany, the disclosures of which are incorporated herein by reference in their entirety.

BACKGROUND

The disclosure relates to a method for driver assistance, wherein a vehicle automatically carries out a driving maneuver. Yet another aspect of the disclosure relates to a driver assistance system which is configured for carrying out the method.

Driver assistance systems that assist the driver of a vehicle in carrying out various driving maneuvers are known in the prior art. Automatic and semiautomatic systems are known in the prior art. In automatic systems, the driving maneuver to be carried out is automatically carried out by the driver assistance system both with respect to the longitudinal guidance and with respect to the transverse guidance of the vehicle. In this case, "longitudinal guidance" is understood to mean the acceleration or braking of the vehicle and "transverse guidance" is understood to mean the steering of the vehicle. In a semiautomatic system, the driver of the vehicle either carries out the longitudinal guidance and the transverse guidance is taken over by the driver assistance system, or the transverse guidance is carried out by the driver of the vehicle and the longitudinal guidance is taken over by the driver assistance system. In the case of an automatic driver assistance system, the driver can also be located outside of the vehicle and can monitor the implementation of the driving maneuver, for example with the aid of a remote control.

DE 10 2006 048 910 A1 describes a failsafe parking assistance system. A brake system control unit, which monitors the function of a service brake system, is provided in this case. If a fault is present, for example at a hydraulic assembly, the vehicle transmission is shifted into the parking position or into the neutral position and a signal is generated at an actuator for the parking brake, in order to actuate the parking brake and brake the vehicle.

DE 10 2012 025 400 A1 describes a method for operating a vehicle having an autonomous driving mode. In this case, it is provided to fine-tune a parking brake unit in order to secure the braking effect even in the event of a fault. To this end, the vehicle comprises a parking brake which can be actuated by means of compressed air and which is separated from a pressure source by means of a monostable valve. If a hydraulic or electrohydraulic brake should fail due to a power failure, the pressure source will be connected to the parking brake, by means of switching the monostable valve, and will therefore be actuated.

DE 10 2006 044 422 A1 describes a method for actuating an electromechanical parking brake of a vehicle. In this case, both a hydraulic service brake of the vehicle as well as the electromechanical parking brake act on a brake piston. Upon actuation of the parking brake, a spindle is driven by an electric motor. The current of the electric motor actuating the spindle is measured. By way of the current measurement, it is possible to establish when the spindle sets down onto the brake piston, and therefore a build-up of clamping force takes place.

The disadvantage of the known prior art is that the response by the parking brake can be delayed if the vehicle is braked with the aid of the parking brake in the event of a fault. Thus, there is a need to reduce the reaction time for the response by a parking brake for the case in which a driver assistance system fails.

SUMMARY

A method for driver assistance is provided, wherein a vehicle automatically carries out a driving maneuver. In this case, a service brake of the vehicle is initially actuated. Subsequent thereto, a parking brake of the vehicle is controlled in such a way that the parking brake has no braking effect and the free travel to be overcome for actuation of the parking brake is minimized. After the control of the parking brake, the service brake of the vehicle is released and the automatic driving maneuver is carried out, wherein, if a fault or a predefined event occurs, the parking brake is actuated, and therefore the vehicle is braked to a standstill and is held at a standstill.

Vehicles are usually equipped with two independent brake systems, namely a service brake and a parking brake. During normal driving operation, the service brake is utilized for decelerating or braking the vehicle, while the parking brake is generally utilized for holding the vehicle in a parking position after stopping.

The service brake usually acts both on the wheels of a front axle as well as on the wheels of a rear axle of the vehicle, while the parking brake generally acts only on the wheels of one axle, for example on the rear axle of the vehicle.

The parking brake utilized in conjunction with the method provided is configured in such a way that the parking brake can be actuated via a driver assistance system of the vehicle. To this end, the parking brake is designed, for example, as an electromechanical parking brake. In an electromechanical parking brake, a brake piston is electromechanically actuated, for example via a spindle-nut system which is driven by an actuator motor. The actuator motor is an electric motor, for example. In order to actuate the parking brake so that the parking brake has a braking effect, the spindle is driven by the actuator motor, and therefore the nut is moved onto the brake piston and applies a force onto the brake piston. Conversely, in order to release the parking brake, the spindle is driven via the actuator motor in such a way that the nut moves away from the brake piston and no longer applies force onto the brake piston. If the parking brake is released, i.e., the parking brake has no braking effect, an air gap is generally present between the nut of the parking brake and the brake piston. In order to actuate the parking brake, this air gap must first be overcome by the spindle before force can be applied onto the brake piston and, therefore, before a braking effect can be achieved. The travel that must be overcome by the nut before a braking effect is achieved is referred to as free travel. If no free travel must be overcome, a braking effect can be immediately generated upon actuation of the parking brake. If free travel must be initially overcome, there is a delay until a braking effect is generated due to the time duration the nut requires until the nut touches the brake piston. In the method according to the disclosure, it is provided to control the parking brake in such a way that there is still no braking effect, but the air gap or free travel is minimized. Preferably, no free travel must be overcome in order to actuate the parking brake.

When the parking brake is released, it must be ensured that the spindle-nut system no longer applies force onto the brake piston. The parking brake and the service brake of the vehicle generally act on the same brake piston. As a result, the distance between the nut and the brake piston can change due to an actuation of the brake piston by way of the service brake.

The vehicle is usually at a standstill at the beginning of the method provided. The vehicle is therefore held at a standstill by way of the actuation of the service brake according to a first step a) of the method. If the vehicle is not yet at a standstill, it will be braked to a standstill while the step a) is being carried out.

In a second step b) of the method, while the vehicle is still held at a standstill by the service brake, the parking brake is controlled in such a way that the parking brake does not have a braking effect, but the brake is adjusted in such a way that the free travel to be overcome for actuation of the parking brake is minimized. In the case of an electromechanical parking brake, the spindle is therefore located in the direct vicinity of the brake piston, and therefore minimal free travel is present between the spindle or the nut and the brake piston. Preferably, there is no free travel between the nut and the brake piston. By way of this step, the parking brake is prepared to provide a braking effect without delay.

In a third step c) of the method, the service brake of the vehicle is released. Therefore, neither the parking brake nor the service brake has a braking effect.

In a fourth step d) of the method, after the service brake is released, the automatic driving maneuver is carried out. The automatic driving maneuver can be, for example, parking in a parking space, unparking from a parking space, or guiding the vehicle along a predefined route, for example through a constriction. Fault monitoring takes place while the automatic driving maneuver is being carried out. The function of the driver assistance system that carries out the automatic driving maneuver, in particular, and preferably also the proper performance of the service brake are thus monitored. If a fault occurs, for example a failure of the service brake, of the driver assistance system or parts thereof, the parking brake is actuated, and therefore the vehicle is braked to a standstill and is held at a standstill. Alternatively or additionally, events can be defined, which, if they occur, the parking brake is actuated as in the event of a fault, and therefore the vehicle is braked to a standstill and is held at a standstill. Such an event can be, for example, reaching a predefined point in the automatically implemented driving maneuver at which the driving maneuver is to be paused.

Since the service brake of the vehicle and the parking brake of the vehicle frequently act on the same brake piston, thereby resulting in an effect on the free travel, it is preferred when the service brake for the axle of the vehicle to which the parking brake is assigned is decoupled during the implementation of at least the step b) of the method, and therefore no effect of the service brake takes place on the axle assigned to the parking brake.

The service brake is typically hydraulically actuated. Electrically actuatable valves can be utilized for decoupling the axle of the vehicle assigned to the parking brake from the service brake, wherein the axle assigned to the parking brake is decoupled from the service brake by way of a suitable actuation of the valves. After the method according to the disclosure has ended, it is provided that the axle assigned to the parking brake is coupled to the service brake again, and therefore the service brake is operated normally again after the method has ended.

If the driving maneuver that is carried out automatically is a parking process, it is preferred when the parking brake is actuated after conclusion of the automatic parking maneuver, and therefore the vehicle is held in a parking position. This corresponds to the usual procedure, in which the driver actuates the parking brake after reaching the parking position in order to secure the vehicle.

If the driver takes control of the vehicle again after conclusion of the driving maneuver, it is preferred when the service brake is actuated after conclusion of the driving maneuver and the vehicle is held at a standstill via the service brake until the control has been taken over by the driver. In this way, the driver can immediately continue his trip.

In the step b) of the method, it is provided to control the parking brake of the vehicle in such a way that the parking brake has no braking effect, but the parking brake does riot need to overcome free travel, or must only overcome minimal free travel, in order to be actuated so that the parking brake has a braking effect. If the parking brake is electromechanically actuatable, for example via a spindle which is moved by means of an actuator motor, it is preferably provided that, in the case of the control of the parking brake according to step b), the actuator motor of the parking brake is operated from a completely retracted state in the direction of releasing the parking brake and the actuator motor is stopped as soon as a clamping force of the parking brake has been reduced.

The reduction in the clamping force is preferably detected by way of monitoring the current progression and/or the voltage progression of the act motor during the control of the parking brake. In this case, the reduction in the clamping force is preferably detected by way of a change in the gradient of the current progression, wherein a change in the gradient induced by the switching-on of the actuator motor is disregarded. This can be implemented, for example, by waiting for a predefined time period after the actuator motor has been switched on until the monitoring of the current progression has begun.

Preferably, a reduction in the clamping force is detected when the current progression falls below a predefined limiting value and the current progression is continuously decreasing within a predefined time period. Alternatively, a reduction in the clamping force can be detected when the current progression falls below a predefined limiting value and the absolute value of a fluctuation of the current progression within a predefined time period falls below a predefined second limiting value.

The predefined time period is predefined, for example, in the range from 30 ms to 50 ms. In practice, the monitoring of the current progression and/or the voltage progression takes place by way of regularly measuring the current or the voltage. Therefore, the predefined time period can also be predefined by way of taking a predefined number of measurements into account. In this way, it can be provided, for example, that the current progression is continuously decreasing for a number of 3 to 5 measurements or that the absolute value of a fluctuation of a predefined number of measured values, for example 3 to 5 measured values, falls below a predefined second limiting value.

The specification of the limiting values for the current, i.e., the specification of the first and the second limiting values, is carried out depending on the particular parking brake or depending on the particular actuator motor. Typical values for the limiting values in an electromechanically actuated parking brake lie in the range from 1 A to 5 A for the first limiting value and in the range from 50 mA to 300 mA for the second limiting value.

If the reduction of the clamping force is detected by way of a change in the gradient, a threshold value is preferably predefined, at which a change in the gradient is classified as a reduction in the clamping force.

Yet another aspect of the disclosure relates to a driver assistance system comprising a control unit, a parking brake controller, and a service brake controller. Preferably, the driver assistance system is designed and/or configured for carrying out the methods described herein. Therefore, features described within the scope of the method are disclosed for the driver assistance system and, conversely, features described within the scope of the driver assistance system are disclosed for the method.

The units of the driver assistance system are to be understood to mean functional units which are not necessarily physically separated from each other. Thus, multiple units of the driver assistance system can be implemented in one single physical unit, for example when multiple functions are implemented in software in a control unit. The units of the driver assistance system can also be implemented in hardware components, in particular by way of sensor units, memory units, application-specific integrated circuits (ASICs), or microcontrollers.

With the aid of the method according to the disclosure or the driver assistance system according to the disclosure, an automatically implemented driving maneuver can be reliably carried out. Since the parking brake is controlled before the automatically implemented driving maneuver is carried out, the parking brake is switched to a state in which no free travel must be overcome in order to generate a braking effect. The parking brake is therefore prepared to provide a braking effect without delay, as needed. In the event of failure of the service brake or detection of a fault related to the driver assistance system, the vehicle can be braked to a standstill without delay by actuating the parking brake and the vehicle can be subsequently held at a standstill. The braking distance is advantageously reduced to a minimum.

In particularly advantageous embodiments of the method, before the control of the parking brake, the service brake of the vehicle is decoupled from the vehicle axle assigned to the parking brake, and thus there is no interaction between the service brake and the parking brake. In this way, the control of the parking brake can take place particularly precisely, and therefore position of the brake is set, at which the brake does not yet have a braking effect and free travel, which must be overcome for the actuation of the parking brake, does not yet occur.

In further advantageous embodiments of the method, the vehicle is transferred into a defined state after conclusion of the automatic driving maneuver. If the driving maneuver is a parking maneuver, the parking brake is actuated after conclusion of the automatic driving maneuver. The vehicle is then held securely in the final parking position. If the automatic driving maneuver is a driving maneuver in which, upon conclusion thereof, the driver would like to take over control, for example, an unparking maneuver, then, upon conclusion of the driving maneuver, only the service brake is actuated, but not the parking brake. The vehicle is therefore in a state which makes it easily possible for the driver to immediately continue driving.

In addition, the method includes the option of temporarily pausing a driving maneuver such as, for example, unparking or parking, when defined events occur. In that case, the parking brake is actuated even before the conclusion of the automatic parking maneuver. When the driver releases the driving maneuver again, the previous state of the parking brake is assumed again and the automatically implemented driving maneuver is continued. Moreover, the defined event can also be an intervention by the driver into the automatically implemented driving maneuver. In this case, the parking brake is likewise actuated before the conclusion of the driving maneuver.

BRIEF DESCRIPTION OF THE DRAWINGS

Exemplary embodiments of the disclosure are represented in the drawings and are described in greater detail in the following description.

In the drawings.

DETAILED DESCRIPTION

In the following description of the exemplary embodiments of the disclosure, identical or similar components and elements are designated using identical reference signs, wherein, in individual cases, a description of the components or elements is not repeated. The figures are merely a schematic representation of the subject matter of the disclosure.

Figure 1:
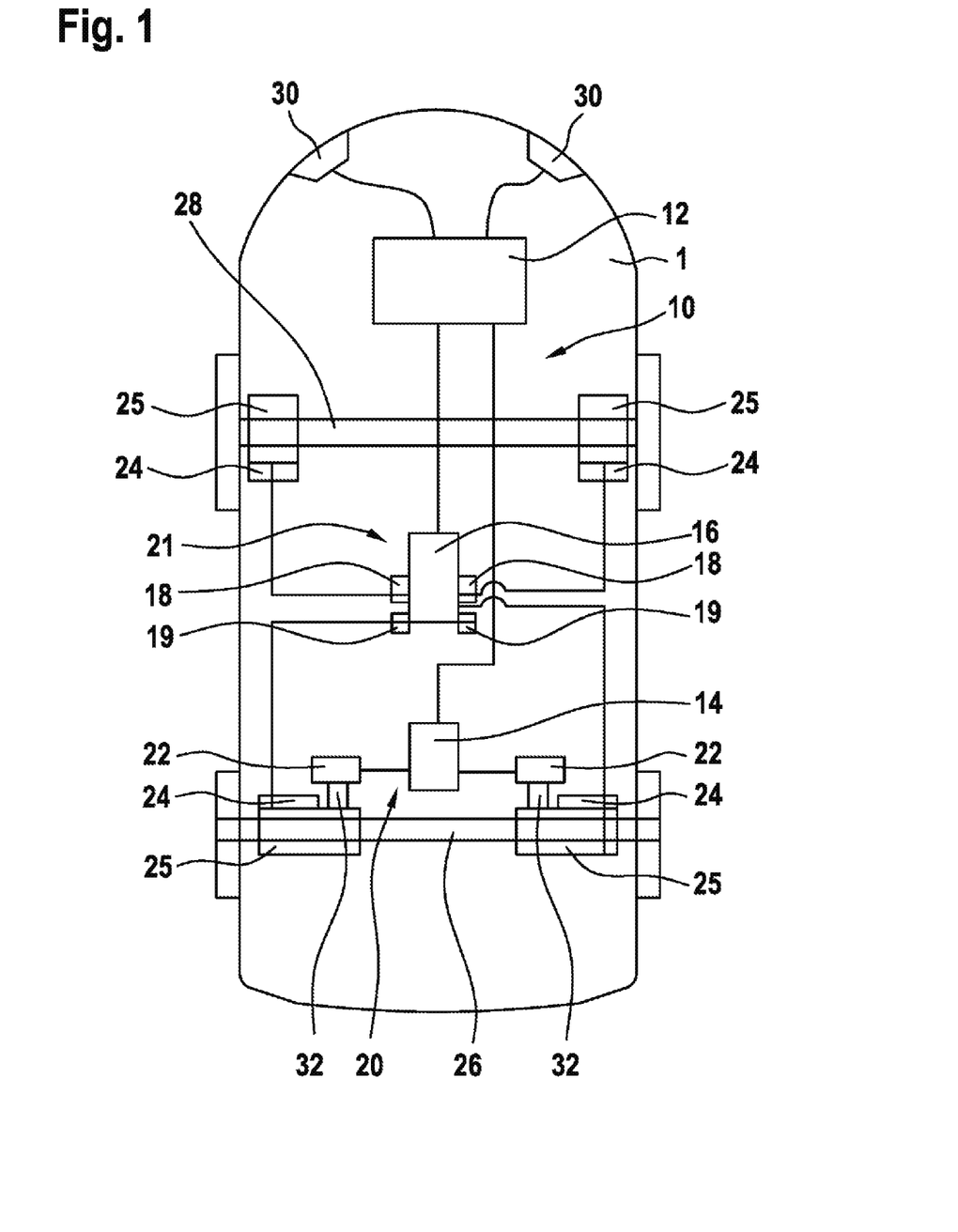
FIG. 1 shows a vehicle comprising a driver assistance system according to the disclosure.

FIG. 1 shows a vehicle 1 comprising a driver assistance system 10. The driver assistance system 10 includes a control unit 12 which is connected to a parking brake controller 14 and a service brake controller 16. In further embodiments, the parking brake controller 14 and the service brake controller 16 can also be combined in one control unit.

The service brake controller 16 controls a service brake 21 of the vehicle 1. The service brake 21 comprises four brake pistons 25, wherein a rear axle 26 and a front axle 28 of the vehicle 1 are each acted on by two brake pistons 25. The brake pistons 25 are each acted on via a hydraulic system 24, wherein the hydraulic system 24 is connected to valves 18, 19 which are controlled by the service brake controller 16.

The parking brake controller 14 is connected to a parking brake 20 of the vehicle 1. The parking brake 20 includes two actuator motors 22, each of which actuates a spindle 32. The spindle 32 works together with a nut 34, see FIG. 2, on the brake piston 25 in order to have a braking effect. To this end, the particular spindle 32 is driven by the actuator motor 22, and therefore the nut 34 is moved toward the brake piston 25 and presses the nut against the brake piston 25.

The control unit 12 is also configured for automatically carrying out a driving maneuver. To this end, the control unit 12 is connected to surroundings sensors 30, via which the control unit 12 can receive data concerning the surroundings of the vehicle 1. Moreover, the control unit 12 includes two connections to further systems of the vehicle 1, which are not represented in FIG. 1. It is provided, in particular, that the control unit 12 can generate a steering angle for the automatic implementation of a driving maneuver and can act on a drive of the vehicle 1. For the purpose of decelerating or braking the vehicle 1, the service brake 21 of the vehicle 1 can be acted on by the control unit 12 and by the service brake controller 16.

Figure 2:
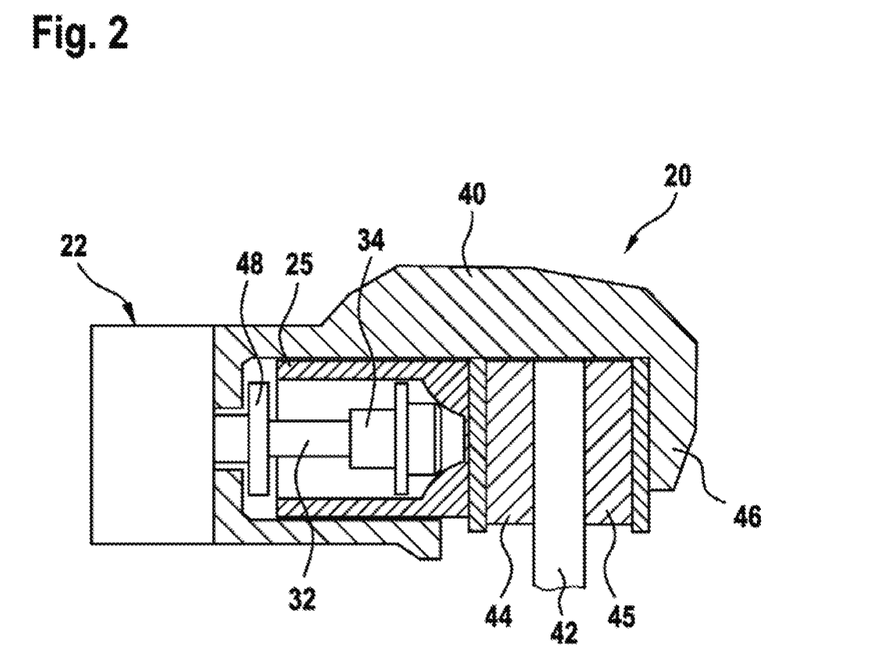
FIG. 2 shows a schematic representation of a parking brake.

FIG. 2 shows a schematic representation of a parking brake 20. The parking brake 20 comprises a brake caliper 40 including a gripping device 46 which engages over a brake disk 42. The parking brake 20 comprises, as the actuator, an actuator motor 22 which rotationally drives a spindle 32, on which a nut 34 is rotatably mounted. During a rotation of the spindle 32, the nut 34 is axially displaced. The nut 34 moves within the brake piston 25 which is the carrier of a brake pad 44 which is pressed against the brake disk 42 by the brake piston 25. Another brake pad 45, which is fixedly held on the gripping device 46, is located on the opposite side of the brake disk 42.

Within the brake piston 25, during a rotary motion of the spindle 32 axially forward, the nut 34 can move in the direction toward the brake disk 42 and, during an opposing rotary motion of the spindle 32 axially backward, the nut can move axially rearward until it reaches a stop 48. In order to generate a clamping force, the nut 34 acts upon the inner end face of the brake piston 25, whereby the axially displaceably mounted brake piston 25 including the brake pad 44 is pressed against the facing end face of the brake disk 42.

Figure 3:
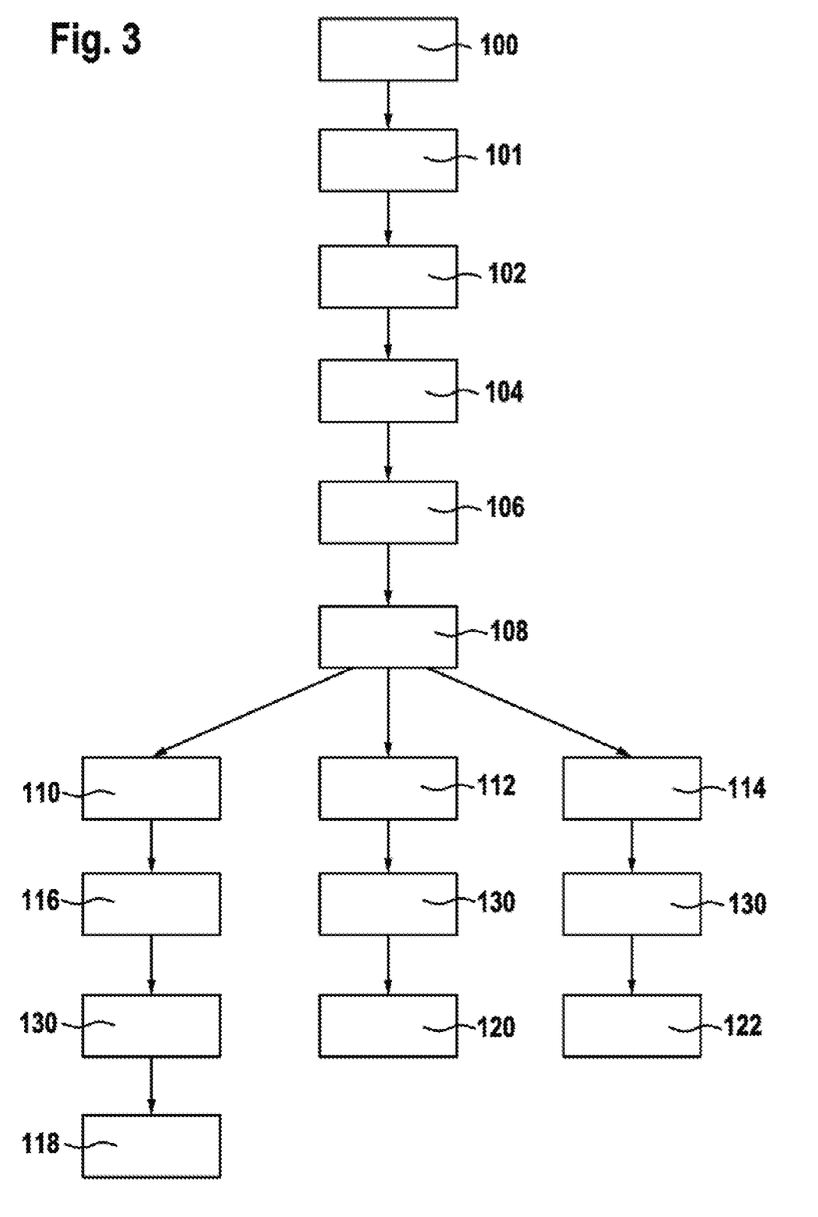
FIG. 3 shows a schematic representation of the method sequence.

FIG. 3 schematically shows the sequence of one preferred embodiment of the method.

The method begins at a start point 100. In a first step 101, the service brake 21 of the vehicle 1 is decoupled from the rear axle 26 of the vehicle 1. To this end, the valves 18, 29 are controlled, wherein the valves assigned to the rear axle 26 are closed, and therefore a pressure build-up for the hydraulic system 24 is possible only at the front axle 28.

The pressure build-up in the service brake 21 takes place in the subsequent or simultaneously occurring step 102, and therefore a braking effect acts on the front axle 28 via the hydraulic system 24 and the brake piston 25.

Simultaneously therewith, or afterward, the parking brake 20 of the vehicle 1 is controlled in the next step 104. If the parking brake 20 has not yet been actuated, the parking brake is now actuated, in order to initially have a braking effect on the rear axle 26. Subsequent thereto, the parking brake 20 is released until the braking effect has been reduced but there is still no free travel present. If the parking brake 20 is designed as an electromechanical brake, the spindle is driven via the actuator motor 22 during the release of the parking brake 20, and therefore the spindle becomes detached from the brake piston 25. The actuator motor 22 is stopped as soon as the braking effect has been completely reduced, wherein there is no clearance yet between the nut 34, which is moved by the spindle 32, and the brake piston 25, i.e., there is still no free travel between the nut 34 and the brake piston 25. Alternatively, the parking brake can be controlled in this step in such a way that the actuator motor is controlled in the direction of locking and is braked in a timely manner, and therefore the free travel has been completely eliminated, but a braking effect does not yet take place.

Subsequent thereto, in a step 106, the vehicle 1 is automatically guided. For example, the vehicle 1 automatically parks in a parking space or unparks from a parking space. A check for faults takes place during the implementation of the automatic driving maneuver, according to step 108 of the method.

If a fault is found, the sequence of the method branches off to a step 110. In response to the fault, which can be present, for example, in the form of a failure of the service brake 21, or which can be, for example, a fault in the driver assistance system 10, the parking brake 20 is actuated in a step 116, and therefore the parking brake has a braking effect on the rear axle 26 of the vehicle 1. Subsequent thereto, in a step 130, the previously decoupled parts of the service brake 21 are coupled, and therefore the service brake 21 is operated normally again. In the final step 118, the method is ended and a check can be carried out by the driver.

If a fault is not found in the check in the step 108, the method branches off to the step 112 or to step 114.

The method branches off to the step 112 if the implemented driving maneuver is a driving maneuver in which the driver takes over the control after conclusion of the driving maneuver. In the step 130, the previously decoupled parts of the service brake 21 are coupled, and therefore the service brake 21 is operated normally again. In the subsequent step 120, the service brake 21 is actuated, and therefore the vehicle 1 is held at a standstill by the service brake 21. Subsequent thereto, the driver can take over the guidance of the vehicle 1.

If the automatically implemented driving maneuver in the step 106 is a driving maneuver in which the vehicle is to be subsequently stopped, the method branches off to the step 114. In this case as well, a coupling of the previously decoupled parts of the service brake 21 are initially coupled, in the step 130, and therefore the service brake 21 is operated normally again. Subsequent thereto, the parking brake is actuated in the step 122, in order to hold the vehicle in the target position reached after the automatic guidance.

Figure 4:
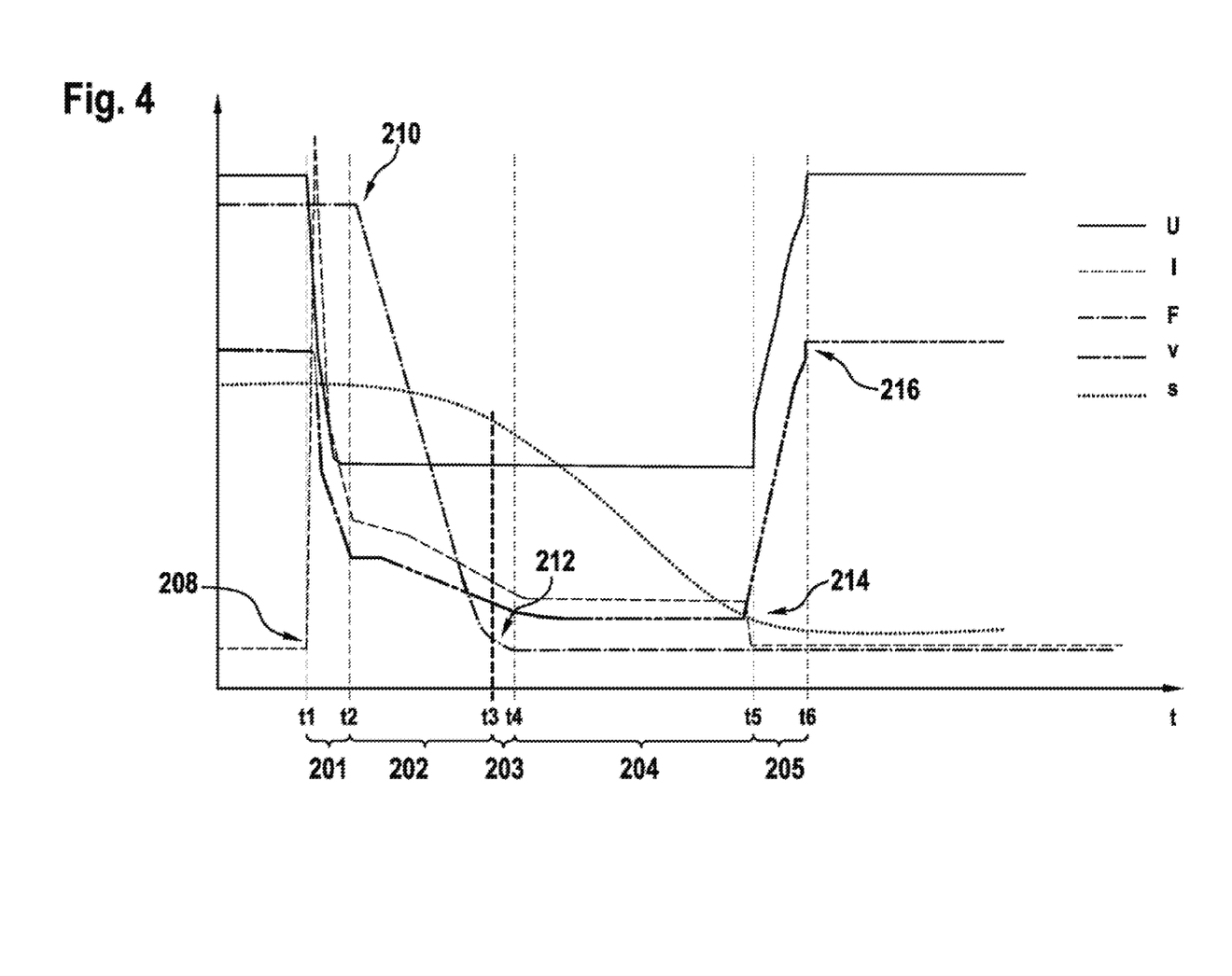
FIG. 4 shows the control of the parking brake without hydraulic release.

FIG. 4 shows a diagram in which a voltage U, a current I, a force F, a speed v, and a displacement s covered by the spindle 32 are plotted as a function of time t for an actuator motor 22 of the parking brake 20 of the vehicle 1. Six points in time, t1 to t6, are marked on the time axis in this case. The diagram in FIG. 4 shows the progression of the plotted variables during the release of the parking brake 20.

The point in time at which the actuator motor 22 is switched on is marked in FIG. 4 using reference sign 208. This reference sign defines the beginning of the first time range 201. In the first time range 201, which runs from the point in time t1 to t2, the release of the parking brake 20 is started. In the first time range 201, a strong increase in the current I therefore occurs, and the voltage U changes as well. The speed v of the spindle 32 increases, wherein the speed 0 is marked using the arrow 216 in the representation in FIG. 4 and increases in the downward direction in the diagram. In the first time range 201, the spindle 32 has not yet covered a noteworthy displacement s, and the clamping force F also remains initially unchanged.

In a second time range 202, which extends from the point in time t2 to the point in time t3, the clamping force F increasingly decreases. Thus, the covered displacement s of the spindle 32 increases. The speed v and the current I continue to increase in the second time range 202, while the voltage U remains constant.

In a third time range 203, which extends from the point in time t3 to the point in time t4, a transition to a free-travel range takes place, in which the spindle 32 or the nut 34 driven by the spindle loses contact with the brake piston 25. The point at which the clamping force F begins to reduce is labeled in FIG. 4 using the reference sign 210.

In the fourth time range 204, which extends from the point in time t4 to the point in time t5, the spindle 32 travels freely, i.e., the nut 34 has no contact with the brake piston 25. The clamping force F does not reduce any further, since the clamping force has reached its lowest possible value. In the absence of a timely switch-off as provided according to the method according to the disclosure, the displacement s covered by the spindle 32 continues to increase, however. This further covered displacement corresponds to the free travel. In the fourth time range 204, the voltage U, the current I, and the speed v remain essentially constant, but the covered displacement s changes.

In the fifth time range 205, which extends from the point in time t5 to the point in time t6, the actuation of the actuator motor 22 is ended. The point at which the actuation of the actuator motor 22 is ended is provided with the reference sign 214. Therefore, the current I and the voltage U drop again to their original value 0, the speed v of the spindle also decreases to 0, and the covered displacement s approaches its final value.

In the method provided, it is proposed according to the disclosure to control the parking brake 20 in such a way that, for example, the change in the gradient in the current I from the third time range 203 to the fourth time range 204 is detected and, in response thereto, the actuation of the actuator motor 22 is immediately ended. It is therefore provided to shorten the fourth time range 204 as compared to the representation in FIG. 4 in such a way that the spindle 32 is stopped as soon as the spindle has released the nut 34 from the brake piston 25 at the point marked with the reference sign 212, and therefore no free travel occurs.

The disclosure is not limited to the exemplary embodiments described here or to the aspects emphasized therein. Rather, a plurality of modifications, which do not go beyond the normal abilities of a person skilled in the art, are possible within the scope of the disclosure.

The invention claimed is:

1. A method for driver assistance in which a vehicle automatically carries out a driving maneuver, the method comprising:
   a) actuating a service brake of the vehicle to bring the vehicle to a standstill;
   b) while the vehicle is held at a standstill by the service brake, controlling a parking brake of the vehicle by (i) operating an actuator motor of the parking brake to move the parking brake from an actuated state in which the parking brake produces a clamping force in a direction of releasing the parking brake, and (ii) stopping the actuator motor as soon as the clamping force of the parking brake has been reduced, such that the parking brake has no braking effect and a free travel to be overcome for actuation of the parking brake is minimized;
   c) after the controlling the parking brake, releasing the service brake of the vehicle; and
   d) after the releasing the service brake, automatically carrying out the driving maneuver and actuating the parking brake in response to one of a fault and a predefined event occurring to brake the vehicle to a standstill and hold the vehicle at the standstill.

2. The method as claimed in claim 1, further comprising:
   assigning the parking brake to one of a front axle of the vehicle and a rear axle of the vehicle; and
   at least during step b), decoupling the service brake from the one of the front axle and the rear axle such that no effect of the service brake takes place on the one of the front axle and the rear axle assigned to the parking brake.

3. The method as claimed in claim 1, wherein the driving maneuver is a parking maneuver, the method further comprising:
   actuating the parking brake after a conclusion of the parking maneuver to hold the vehicle in a parking position.

4. The method as claimed in claim 1, wherein a driver takes control of the vehicle again after a conclusion of the driving maneuver, the method further comprising:
   actuating the service brake after the conclusion of the driving maneuver to hold the vehicle at a standstill via the service brake until the control has been taken over by the driver.

5. The method as claimed in claim 1, wherein the parking brake is configured to be electromechanically actuated.

6. The method as claimed in claim 1, further comprising:
   detecting whether the clamping force has been reduced by monitoring at least one of a current progression of the actuator motor and a voltage progression of the actuator motor during the control of the parking brake.

7. The method as claimed in claim 6, further comprising:
   detecting whether the clamping force has been reduced by detecting a change in a gradient of the current progression and disregarding a component of the change in the gradient that is induced by a switching-on of the actuator motor.

8. The method as claimed in claim 6, further comprising:
   detecting whether the clamping force has been reduced in response to the current progression falling below a predefined limiting value and continuously decreasing within a predefined time period.

9. The method as claimed in claim 6, further comprising:
   detecting whether the clamping force has been reduced in response to the current progression falling below a predefined first limiting value and an absolute value of a fluctuation of the current progression within a predefined time period falling below a predefined second limiting value.

10. A driver assistance system comprising:
    a control unit;
    a parking brake controller; and
    a service brake controller,
    wherein the control unit, the parking brake controller, and the service brake controller are configured to:
    a) actuate a service brake of the vehicle to bring the vehicle to a standstill;
    b) while the vehicle is held at a standstill by the service brake, control a parking brake of the vehicle by (i) operating an actuator motor of the parking brake to move the parking brake from an actuated state in which the parking brake produces a clamping force in a direction of releasing the parking brake, and (ii) stopping the actuator motor as soon as the clamping force of the parking brake has been reduced, such that the parking brake has no braking effect and a free travel to be overcome for actuation of the parking brake is minimized;
    c) after the control of the parking brake, release the service brake of the vehicle; and
    d) after the release of the service brake, automatically carry out a driving maneuver and actuate the parking brake in response to one of a fault and a predefined event occurring to brake the vehicle to a standstill and hold the vehicle at the standstill.

* * * * *

UNITED STATES PATENT AND TRADEMARK OFFICE
CERTIFICATE OF CORRECTION

Page 1 of 1

PATENT NO. : 11,161,485 B2
APPLICATION NO. : 15/754322
DATED : November 2, 2021
INVENTOR(S) : Baehrle-Miller It is certified that error appears in the above-identified patent and that said Letters Patent is hereby corrected as shown below:

On the Title Page

On Page 2, in Item (56) References Cited, in Column 2, Lines 4-5 under the heading FOREIGN PATENT DOCUMENTS:
"GN 101835664 A 9/2010" should read --CN 101835664 A 9/2010--; and
"GN 103249614 A 8/2013" should read --CN 103249614 A 8/2013--.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*